(12) United States Patent
Bakulina et al.

(10) Patent No.: US 10,949,431 B2
(45) Date of Patent: Mar. 16, 2021

(54) RANKING OPERATIONS IN QUERY PROCESSING

(71) Applicant: SAP SE, Walldorf (DE)

(72) Inventors: Alena Bakulina, Mannheim (DE); Christoph Weyerhaeuser, Leimen (DE)

(73) Assignee: SAP SE, Walldorf (DE)

( * ) Notice: Subject to any disclaimer, the term of this patent is extended or adjusted under 35 U.S.C. 154(b) by 415 days.

(21) Appl. No.: 15/946,028

(22) Filed: Apr. 5, 2018

(65) Prior Publication Data

US 2019/0311043 A1 Oct. 10, 2019

(51) Int. Cl.
*G06F 16/2457* (2019.01)
*G06F 7/08* (2006.01)
*G06F 16/22* (2019.01)

(52) U.S. Cl.
CPC .......... *G06F 16/24578* (2019.01); *G06F 7/08* (2013.01); *G06F 16/2282* (2019.01)

(58) Field of Classification Search
CPC ... G06F 16/24578; G06F 16/2282; G06F 7/08
See application file for complete search history.

(56) References Cited

U.S. PATENT DOCUMENTS

| | | | |
|---|---|---|---|
| 10,198,475 B2* | 2/2019 | Mindnich | G06F 16/24544 |
| 10,275,490 B2* | 4/2019 | Weyerhaeuser | G06F 16/24549 |
| 10,324,930 B2* | 6/2019 | Weyerhaeuser | G06F 16/24549 |
| 10,394,805 B2* | 8/2019 | Warrier | G06F 16/27 |
| 10,459,760 B2* | 10/2019 | Scheuer | G06F 9/4881 |
| 10,713,248 B2* | 7/2020 | Gerweck | G06F 16/24575 |
| 2012/0109934 A1* | 5/2012 | Weyerhaeuser | G06F 16/9535 707/713 |
| 2016/0217182 A1* | 7/2016 | Mindnich | G06F 16/24544 |
| 2016/0217210 A1* | 7/2016 | Weyerhaeuser | G06F 16/24549 |
| 2019/0311059 A1* | 10/2019 | Bakulina | G06F 16/2282 |

* cited by examiner

*Primary Examiner* — Robert W Beausoliel, Jr.
*Assistant Examiner* — Susan F Rayyan
(74) *Attorney, Agent, or Firm* — Mintz Levin Cohn Ferris Glovsky and Popeo, P.C.

(57) ABSTRACT

Described herein is a top operator of a calculation scenario of a calculation engine that can process and rank data according to certain logical criterion requested in a query. Based on the ranked data, the top operator can provide the data results in response to the query. The top operator can provide additional useful data in the data results when certain conditions are met. The top operator can provide the data results in a useful and efficient manner.

20 Claims, 6 Drawing Sheets

RANKING OPERATIONS IN QUERY PROCESSING

TECHNICAL FIELD

The subject matter described herein relates to various embodiments of a calculation engine that processes data using top operators for efficient processing.

BACKGROUND

A database deployment infrastructure can be a service layer of a database management system that simplifies the deployment of database objects and other design time artifacts by providing a declarative approach for defining these design time artifacts and ensuring a consistent deployment into the database management system environment (DBMS), based on a transactional all-or-nothing deployment model and implicit dependency management. Such an approach can leverage capabilities of a modern high-speed DBMS, such as for example the HANA in-memory DBMS available from SAP SE of Walldorf, Germany, which can provide very high performance relative to disk-based approaches.

Using various customization-enabling integrated development environments (IDE), such as for example the HANA Studio available for use with the HANA IM-DBMS (available from SAP SE of Walldorf, Germany), a user may, using a group of design time artifacts, create information models, tables, landscapes, etc. on a different system or systems than that on which a DBMS is executed.

The demand for ad-hoc and real-time data analyses by many users simultaneously is increasing in the same way that the data quantities to be processed are increasing. To keep pace with the competition in the current economic climate, it is crucial to have the latest information about processes within an organization (e.g. a company) and/or in the market to be able to make the right decisions promptly.

Large data sets that are to be processed can oftentimes exceed the available memory, preventing the data sets from being completely loaded into the available memory. Data flow between an application server and a database server can be largely dependent on the scope and number of queries generated by the application server. Complex calculations can involve numerous queries of the database server which in turn can consume significant resources in connection with data transport as well as application server-side processing of transported data. Calculation engines can sometimes be employed by applications and/or domain specific languages in order to effect such calculations. Such calculation engines can execute calculation models/scenarios that comprise a plurality of hierarchical calculation nodes.

Calculation scenarios can be used inside database systems to model complex queries. In order to improve reusability and to provide a flexible design, calculation scenarios can expose more attributes than are required to answer various queries (e.g., the calculation scenario often exposes that a super set of attributes that might possibly be required, etc.).

SUMMARY

Systems, methods, and articles of manufacture, including computer program products, are provided for processing a query for ranking certain data sets and/or subsets. In one aspect, there a method includes receiving a query that provides top logic for a set of data located in a data table. The query can specify a calculation scenario. The calculations scenario can include a top operator of a calculation engine. The top operator may specify an attribute and a target value. The attribute can include a base attribute and a top attribute, and the target value defining a target sum. The method further includes the top operator sorting the set of data within the data table according to a field direction that indicates a direction the set of data is to be sorted. The sorting includes dividing the set of data within the data table into one or more groups based on the base attribute. The one or more groups include one or more fields of the data table. The method also includes the top operator processing each field of each group of the one or more groups in the field direction and providing, in response to the query, each field in each group that includes a top attribute that forms a part of the aggregate value. The processing includes aggregating values of consecutive top attributes in the field direction until the aggregate value of the top attributes is equal to or greater than the target sum.

In optional variations one or more additional features, including but not limited to the following, can be included in any feasible combination. For example, the method may further include determining that the aggregate value of the top attributes is equal to or greater than the target sum. The target sum may be determined by aggregating all of the values of the top attributes in each group of the one or more groups and applying the target value to the aggregated values of the top attributes in each group. The target value may represent a percentage. In some variations, the attribute may include a plurality of view attributes.

In other examples, the method, may further include determining that an olympic ranking flag operator is active and applying the olympic ranking operations, in which the values of consecutive top attributes include a first value or a last value. In some variations, the applying of the olympic ranking operations may include determining that a next value of the top attribute is identical to the last value, where the next value includes a value of the top attribute of the data entry that follows the last entry in the sorting direction. In some variations, the applying of the olympic ranking operations may further include providing the field corresponding to the next value.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A database system can include multiple tables. A table is a collection of related data held in a structured format within a database. A table typically consists of fields, or columns, and rows. In some variations, the cells of the table may include database commands linking to data that is held externally to the database.

A database system can typically include a database management system. The database management system can comprise multiple layers or levels. The different layers can be configured to perform different types of operations. For example, the lowest layer, or physical layer, of a database management system can be configured to perform the actual operations requested by the users of the database management system. At the physical layer, a conceptual instruction provided by a user may have been translated into many instructions that are readable by the database.

A middle layer, or logical layer, can be configured to consolidate external concepts and instructions into an intermediate data structure. The intermediate data structure can be capable of being devolved into the physical instructions for implementation at the physical layer. The logical layer can be configured to provide execution pathways of operations to multiple different databases and/or database tables, in response to instructions received from the top layer, or view layer.

The view layer can be configured to implement applications that are provided to users of the database management system. Database operations can be represented as database access. In some variations, individual databases within a database system can be viewed as the same at this layer, despite differences in content and operation of those individual databases.

In some variations, the view layer can be a calculation engine layer. The calculation engine layer can be configured to facilitate the processing of user queries and requests using diverse calculation operations. When processing queries, having the tables loaded into the main memory of the database management system increases the efficiency at which the database management system can execute queries, improving the optimization of the database management system.

There may exist database tables that exceed the size limits of the available memory in the main memory of the database management system. Consequently, if the whole table is accessed for a query, the database management system may be required to continually transfer data between the main memory and the disk memory of the database management system. Similarly, a query may be requested by a user that does not require the entire contents of a database table to be loaded into the main memory of the database management system.

Aspects of the current subject matter include a query for implementing a calculation scenario of a calculation engine that effectively ranks and provides data for processing at the same or separate host, including in parallel. To process data more efficiently, calculation scenarios in database systems, such as SAP HANA systems, often require the top logic for a set of data. For example, the top logic can include situations such as determining the top number of certain attributes, such as a ranking of customers by sales per product, among other configurations. Determining the top logic of the data available can help to sort the data in a logical manner, producing better and/or more useful results. These results can help to make decisions regarding the set of data more efficiently and effectively.

Typically, a top operator can be implemented to determine the top logic on the data sets. The top operator can be implemented by the calculation engine to define the number N of top rows that should be selected and/or presented as the top data. Such typical systems may be limited by merely sorting a data table according to a selected filter and selecting the number N of top rows in the sorted data table.

Aspects of the current subject matter can allow for operations that may provide top rows from the data table based on one or more logical criterion. Logical criterion can include, but may not be limited to, data selected based on the cumulated sum of a column, such as when the data is included into the result only if it's cumulated sum lies under a threshold, and/or olympic ranking of data, such as when all rows containing certain of the same data are selected into the provided result such that the order the rows appear in the dataset does not influence the result. The top operator according to implementations of the current subject matter can desirably implement logic for providing results according to the cumulative sum and/or percent, and/or olympic ranking of results, among other criterion. Such configurations can desirably provide more useful results that can be used for further processing, to make processing more efficient and/or to make decision-making easier, such as when the data sets include large amounts of data.

In some implementations, the top logic can be determined during run-time (e.g., "on the fly"). In some implementations, the top operator can define not only the number N first and/or 1 as rows, but a number M rows, in which M is a variable that can be determined only at runtime after analyzing the input data.

Figure 1:
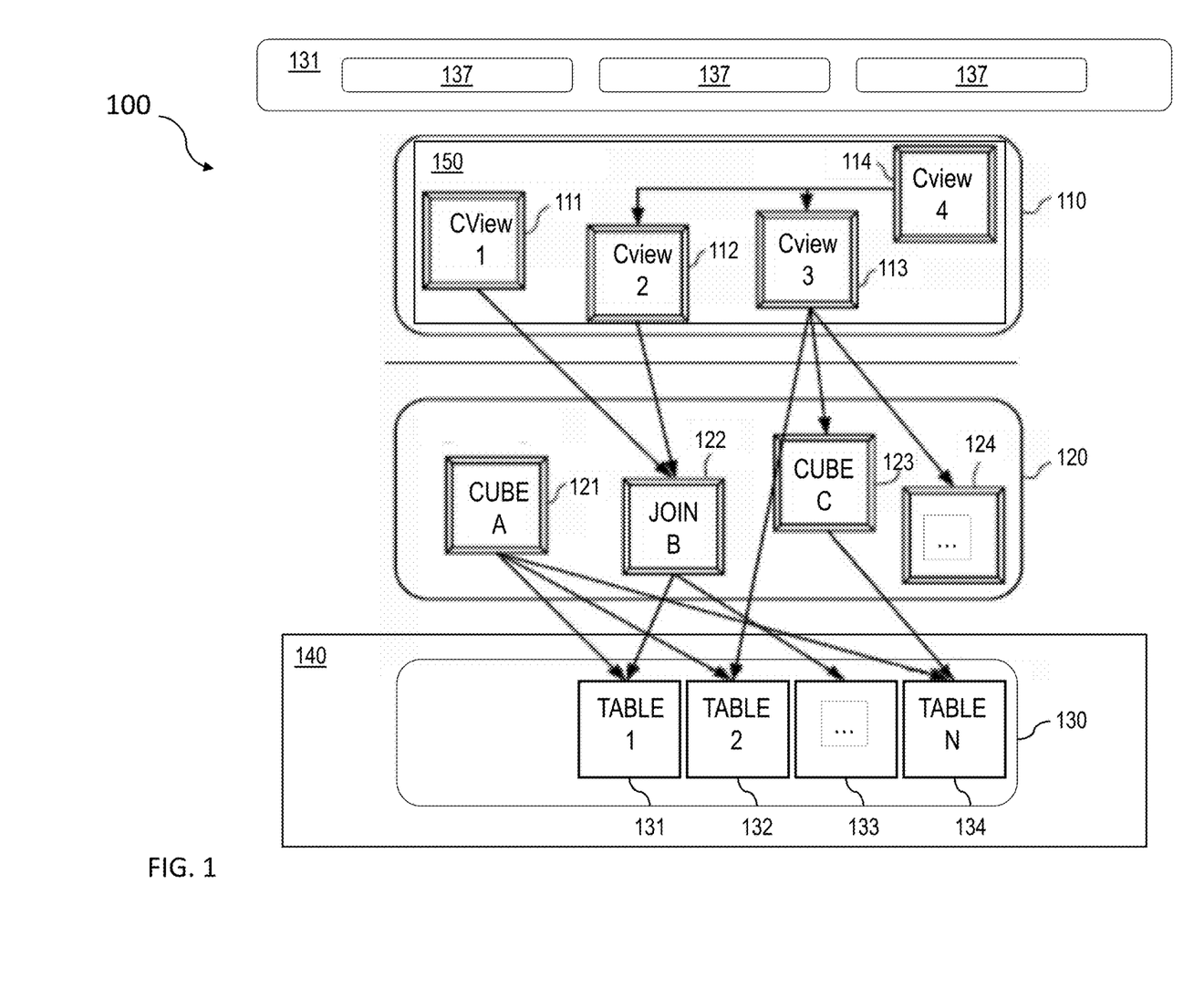
FIG. 1 shows a diagram illustrating a computing architecture consistent with implementations of the current subject matter including a database system that includes three layers: a calculation engine layer, a logical layer, and a physical table-pool.

FIG. 1 is a diagram that illustrates a computing architecture 100 including a database system that includes three layers: a calculation engine layer 110, a logical layer 120, and a physical table-pool 130. One or more application servers 135 implementing database client applications 137 can access the database system. Calculation scenarios can be executed by a calculation engine, which can form part of a database or which can be part of the calculation engine layer 110 (which is associated with the database). The calculation engine layer 110 can be based on and/or interact with the other two layers, the logical layer 120 and the physical table pool 130. The basis of the physical table pool 130 consists of physical tables (called indexes) containing the data, which can be stored on one more database servers 140. Various tables 131-134 can be joined using logical metamodels 121-124 defined by the logical layer 120 to form an index. For example, the tables 131-334 in a cube (e.g. an online analytical processing or "OLAP" index) can be assigned roles (e.g., fact or dimension tables) and joined to form a star schema. It is also possible to form join indexes (e.g. join index B 122 in FIG. 1), which can act like database views in computing environments such as the Fast Search Infrastructure (FSI) available from SAP SE of Walldorf, Germany.

As stated above, a calculation scenario 150 can include individual nodes (e.g. calculation nodes) 111-314, which in turn each define operations such as joining various physical or logical indexes and other calculation nodes (e.g., CView 4 is a join of CView 2 and CView 3). That is, the input for a node 111-114 can be one or more physical, join, or OLAP indexes or calculation nodes.

In a calculation scenario 150, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 150 can be created which can be reused by multiple queries even if such queries do not require every attribute specified by the calculation scenario 150.

Every calculation scenario 150 can be uniquely identifiable by a name (e.g., the calculation scenario 150 can be a database object with a unique identifier, etc.). Accordingly, the calculation scenario 150 can be queried in a manner similar to a view in a SQL database. Thus, the query is forwarded to the calculation node 111-114 for the calculation scenario 150 that is marked as the corresponding default node. In addition, a query can be executed on a particular calculation node 111-114 (as specified in the query). Furthermore, nested calculation scenarios can be generated in which one calculation scenario 150 is used as source in another calculation scenario (e.g. via a calculation node 111-114 in this calculation scenario 150). Each calculation node 111-114 can have one or more output tables. One output table can be consumed by several calculation nodes 111-114.

Figure 2:
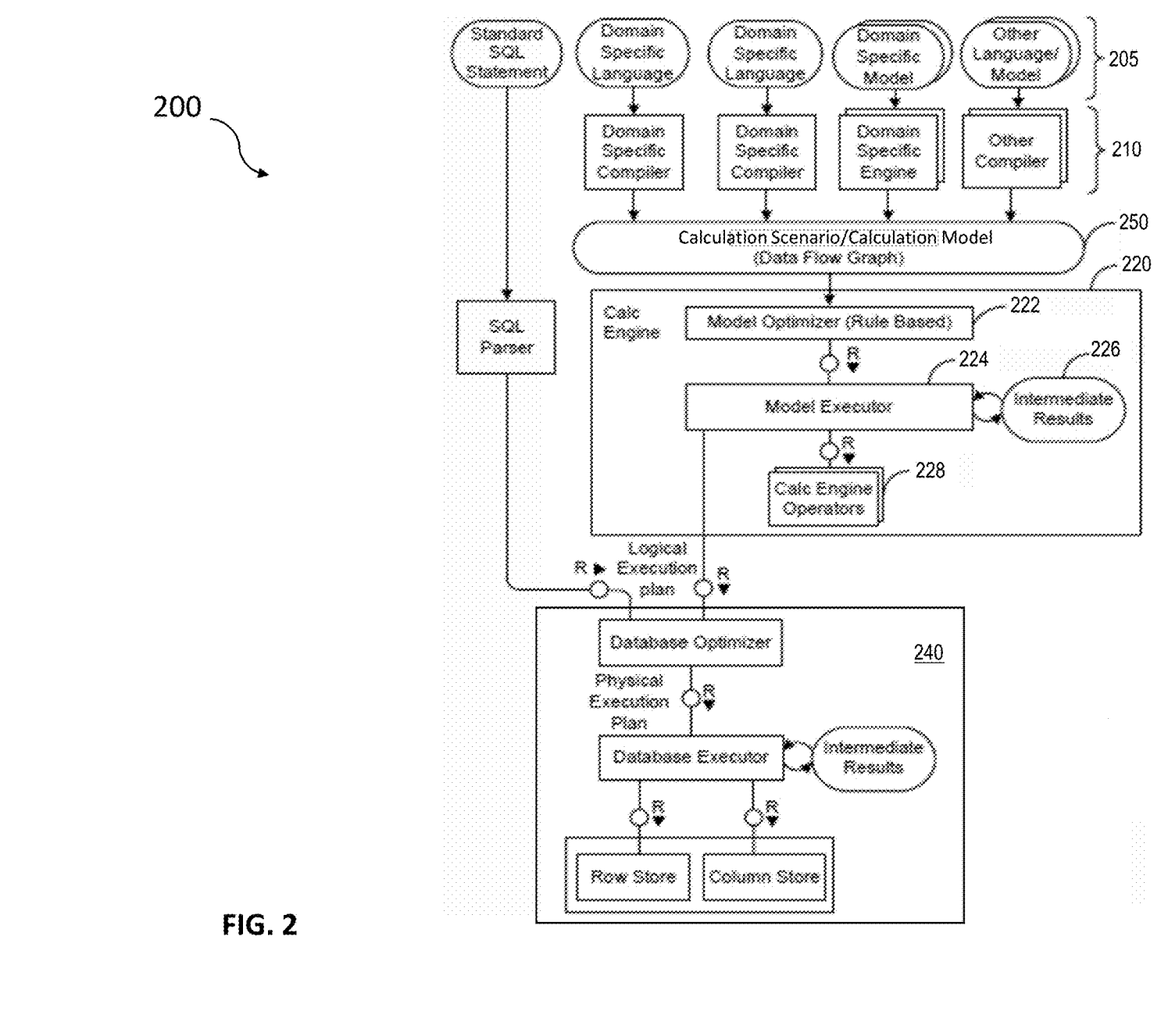
FIG. 2 shows a diagram illustrating a sample architecture for request processing and execution control consistent with implementations of the current subject matter.

FIG. 2 is a diagram 200 illustrating a sample architecture for request processing and execution control. As shown in FIG. 2, artifacts 205 in different domain specific languages can be translated by their specific compilers 210 into a common representation called a "calculation scenario" 250 (which is also referred to in in FIG. 2 as a calculation model). To achieve enhanced performance, the models and programs written in these languages are executed inside the database server 240. This arrangement eliminates the need to transfer large amounts of data between the database server 240 and a client application 537, which can be executed by an application server 535. Once the different artifacts 205 are compiled into this calculation scenario, they can be processed and executed in the same manner. A calculation engine 220 executes the calculation scenarios 250.

A calculation scenario 250 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 537 at the application server 535). Inputs can be connected to tables or to the outputs of other nodes. A calculation scenario 250 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 250 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

A calculation scenario 250 can be defined as part of database metadata and invoked multiple times. A calculation view can be created, for example, by a SQL statement "CREATE COLUMN VIEW <schema>.<viewName> TYPE CALCULATION WITH PARAMETERS". Once a calculation view is created it can be queried (e.g., "SELECT FROM <calcview_name>", etc.). In some cases, databases can have pre-defined calculation scenarios 250 (default, previously defined by users, etc.). Calculation scenarios 250 can be persisted in a repository (coupled to the database server 240) or in transient scenarios. Calculation scenarios 250 can also be kept in-memory.

Calculation scenarios 250 are more powerful than traditional SQL queries or SQL views for many reasons. One reason is the possibility to define parameterized calculation schemas that are specialized when the actual query is issued. Unlike a SQL view, a calculation scenario 250 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 250 may contain an aggregation node containing all attributes. Later, the attributes for grouping can be supplied with the query. This allows having a predefined generic aggregation, with the actual aggregation dimensions supplied at invocation time. The calculation engine 220 can use the actual parameters, attribute list, grouping attributes, and the like supplied with the invocation to instantiate a query specific calculation scenario 250. This instantiated calculation scenario 250 is optimized for the actual query and does not contain attributes, nodes or data flows that are not needed for the specific invocation.

When the calculation engine 220 gets a request to execute a calculation scenario 250, it can first optimize the calculation scenario 250 using a rule based model optimizer 222. Examples for optimizations performed by the model optimizer can include "pushing down" filters and projections so that intermediate results 226 are narrowed down earlier, or the combination of multiple aggregation and join operations into one node. The optimized model can then be executed by a calculation engine model executor 224 (a similar or the same model executor can be used by the database directly in some cases). This includes decisions about parallel execution of operations in the calculation scenario 250. The model executor 224 can invoke the required operators (using, for example, a calculation engine operators module 228) and manage intermediate results. Most of the operators are executed directly in the calculation engine 220 (e.g., creating the union of several intermediate results). The remaining nodes of the calculation scenario 250 (not implemented in the calculation engine 220) can be transformed by the model executor 224 into a set of logical database execution plans. Multiple set operation nodes can be combined into one logical database execution plan if possible.

The calculation scenarios 250 of the calculation engine 220 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 220 to execute the calculation scenario 250 behind the calculation view. In some implementations, the calculation engine 220 and the SQL processor are calling each other: on one hand the calculation engine 220 invokes the SQL processor for executing set operations and SQL nodes and, on the other hand, the SQL processor invokes the calculation engine 220 when executing SQL queries with calculation views.

The attributes of the incoming datasets utilized by the rules of model optimizer 222 can additionally or alternatively be based on an estimated and/or actual amount of memory consumed by the dataset, a number of rows and/or columns in the dataset, and the number of cell values for the dataset, and the like.

A calculation scenario 250 as described herein can include a type of node referred to herein as a semantic node (or sometimes semantic root node). A database modeler can flag the root node (output) in a graphical calculation view to which the queries of the database applications directed as semantic node. This arrangement allows the calculation engine 220 to easily identify those queries and to thereby provide a proper handling of the query in all cases.

Figure 3:
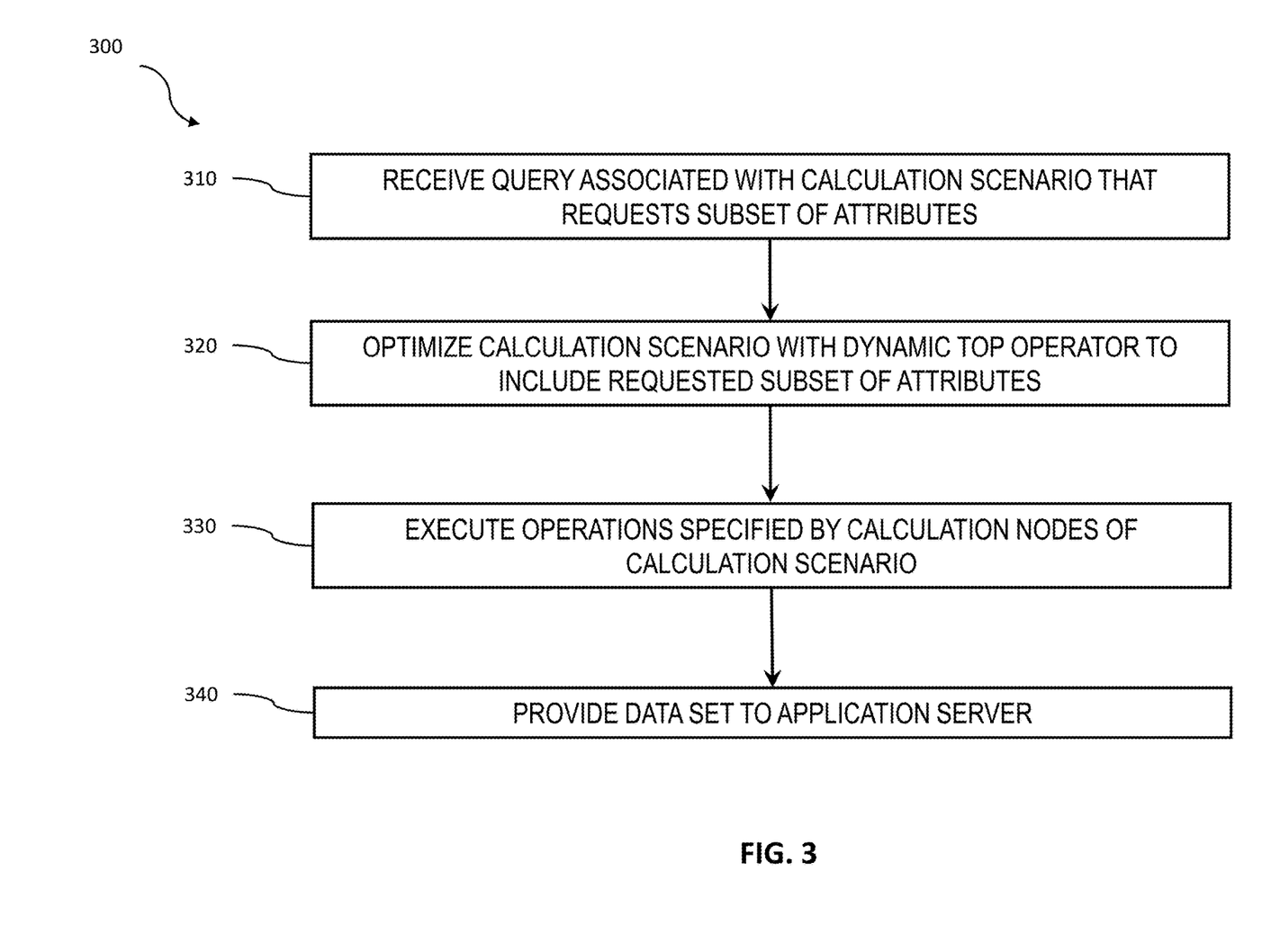
FIG. 3 is an example process flow diagram illustrating execution of a calculation scenario having a top operator consistent with implementations of the current subject matter.

FIG. 3 is a process flow diagram illustrating a method 300 in which, at 310, a query is received by a database server from an application server (e.g., a remote application server) that is associated with a calculation scenario that defines a data flow model including one or more calculation nodes. Each calculation node defines one or more operations to execute on the database server. A top operator node of the calculation nodes specifies a plurality of attributes. The query requests a subset of the attributes specified by the top operator node. At 320, the database server instantiates the optimized calculation scenario so that the calculation scenario optimizes the calculation scenario by requesting only the subset of attributes. At 330, the operations defined by the calculation nodes of the instantiated calculation scenario can be executed to result in a responsive data set. At 340, the data set can be provided to the application server by the database server.

Generally, the top operation can be parameterized by setting a number of lines that should be returned and defining a number of base attributes with a sort direction. The sort can be performed and the number of defined lines can be returned. In some implementations, a special top attribute can be defined that allows getting the top number of lines for each group of this attribute. The operation is expected to return the top number N of rows (e.g., the top rows N of products ordered by region).

Figure 4:
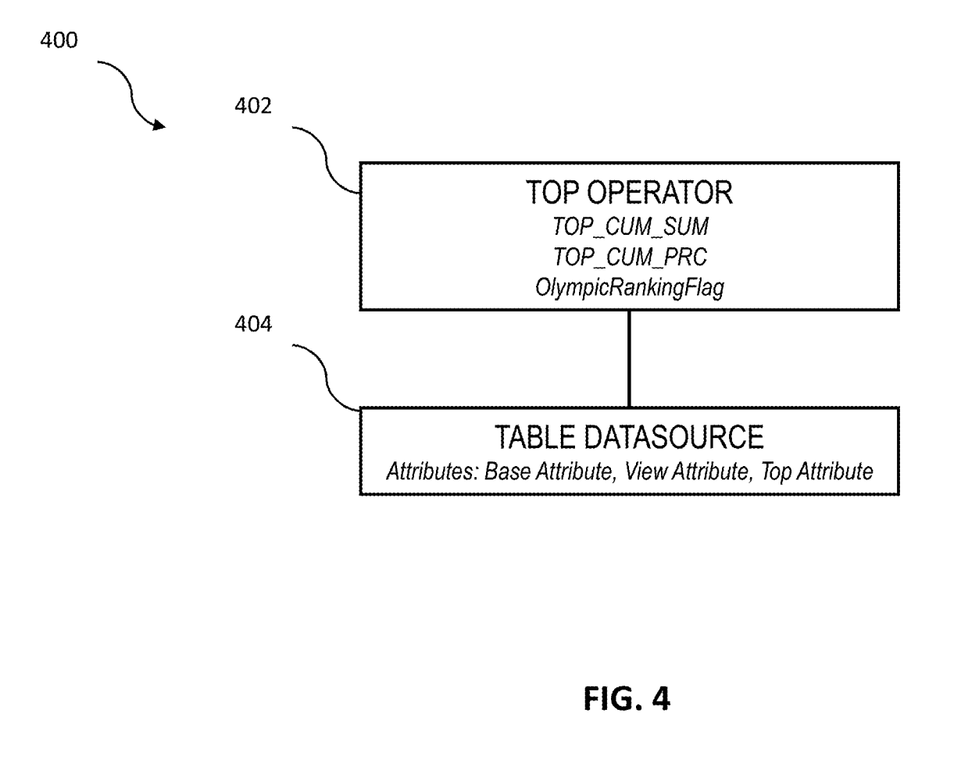
FIG. 4 is an example diagram illustrating a calculation scenario with a top operator consistent with implementations of the current subject matter.

FIG. 4 illustrates an example calculation scenario 400 at design time according to implementations of the current subject matter Ft. The calculation scenario 400 can include a table datasource 404 and a top operator 402. With this example, the underlying table 404 can include any table including a set of data, such as the example of the table shown in FIG. 5. The table 404 can include a plurality of attributes (e.g., columns) that correspond to a variety of fields and can be used by the top operator 404 to sort, filter, and/or rank the fields. The top operator 402 can include a plurality of top operators, such as TOP_CUM_SUM (e.g., cumulative sum), TOP_CUM_PRC (e.g., cumulative percent), and/or OlympicRankingFlag (e.g., olympic ranking), as described in more detail below.

Typically, the top operator 402 can include attributes that are static (similar to join attributes for a join operator). If a static top operator specifies two base attributes, they are requested independent from the attributes that are requested by the query. In contrast to static top operators, top operators according to the current subject matter can allow for the specification of a superset of base attributes on the top operator and to flag the top operator node (e.g., 402) for dynamic behavior. This flag can be evaluated by the instantiation process of the calculation engine. The instantiation process can remove all base attributes on the top operator that are not requested by the query. Thus dynamic top operator results can be provided. In some implementations, a top operator can act in a dynamic fashion if the query specifies same (for example, via a flag, etc.). The flag can be evaluated in the instantiation process for the calculation scenario 400 and the dynamic operation can reduce the number of base attributes of the top operator. An error may be returned of no base attribute is requested in the end.

Figure 5:
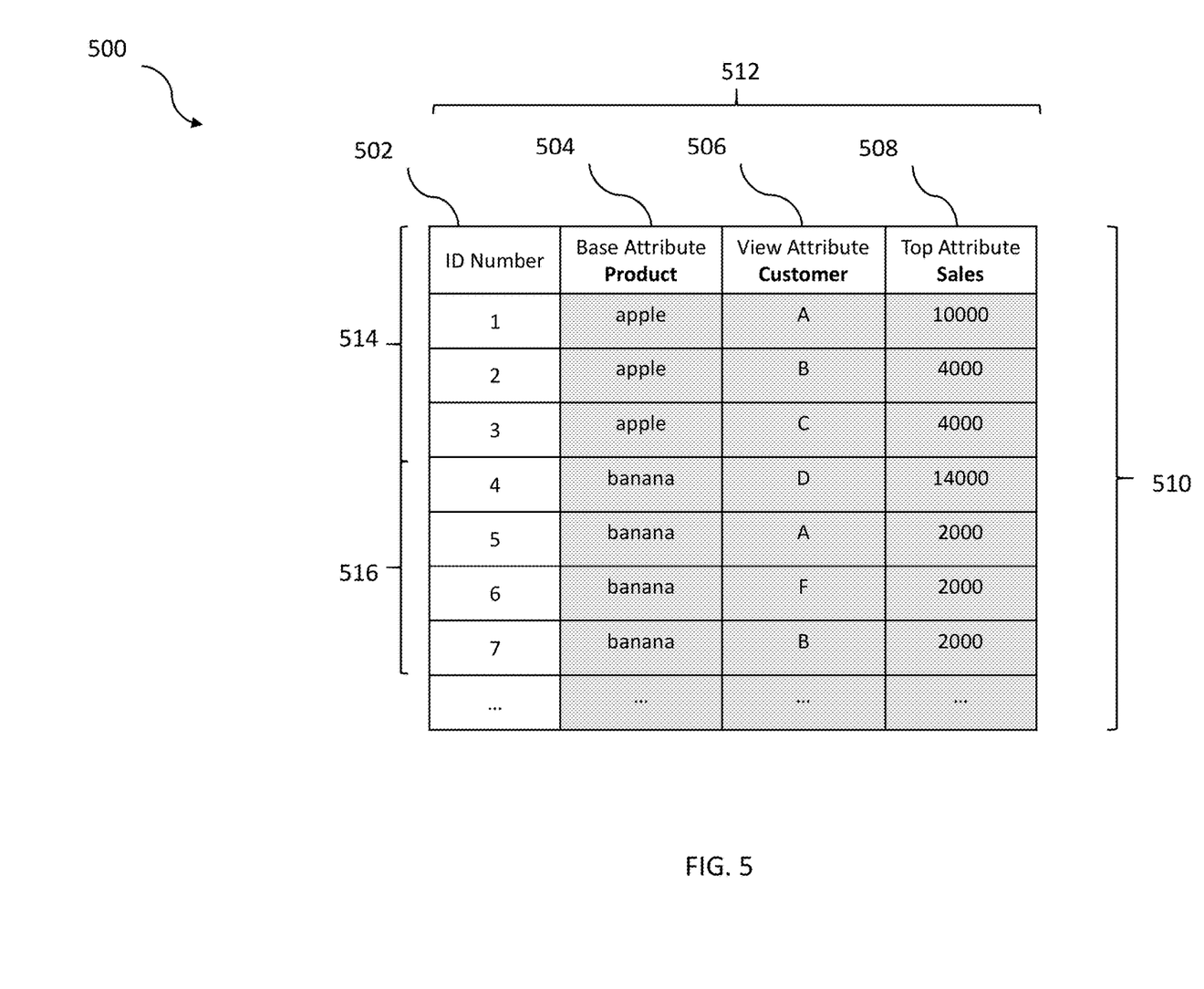
FIG. 5 is an example table datasource consistent with implementations of the current subject matter.

FIG. 5 illustrates an example datasource operator or table 500 according to implementations of the current subject matter. The table 500 can include a plurality of rows 510 and columns 512. Each of the rows 510 can field corresponding to a customer of a group. Each of the columns 512 can represent an attribute. As mentioned above, the table 500 can include a plurality of attributes. In some implementations, the attributes can include a base attribute 504, a view attribute 506, and a top attribute 508. In some implementations, the base attribute 504 can include a plurality of base attributes. In some implementations, the view attribute 506 can include a plurality of view attributes.

The base attribute 504 can include a value that is used to a build a group within the data set. In some implementations, the base attribute 504 includes a type of product, among other attributes. Each group can be defined by one or more fields that have the same base attribute value. For example, the table 500 can include at least one group, such as one, two, three, four, five, or more groups. As shown in FIG. 5, the table 500 can include a first group 514 and a second group 516. The first group 514 shown in table 500 includes fields having the base attribute apple and the second group 516 shown in table 500 includes fields having the base attribute banana. As explained in more detail below, the top operator can be applied independently to each group.

The view attribute 506 can include attributes that are selected to be provided as part of the result, but do not influence the selection of certain fields. For example, the view attribute 506 can include the customer, among other types of view attributes.

The top attribute 508 can influence selection of certain fields to provide as part of the result by the top operator. The top attribute 508 can include sales, among other types of top attributes. The top attributes for each group can be aggregated and/or compared to a selected target value by the top operator.

As mentioned above, the top operator of the calculation engine can provide and/or define the number N of top fields (e.g., the top logic for a certain set of data) of a table that should be selected according to logical criterion. Such configurations can help to provide better and/or more useful results.

Figure 6:
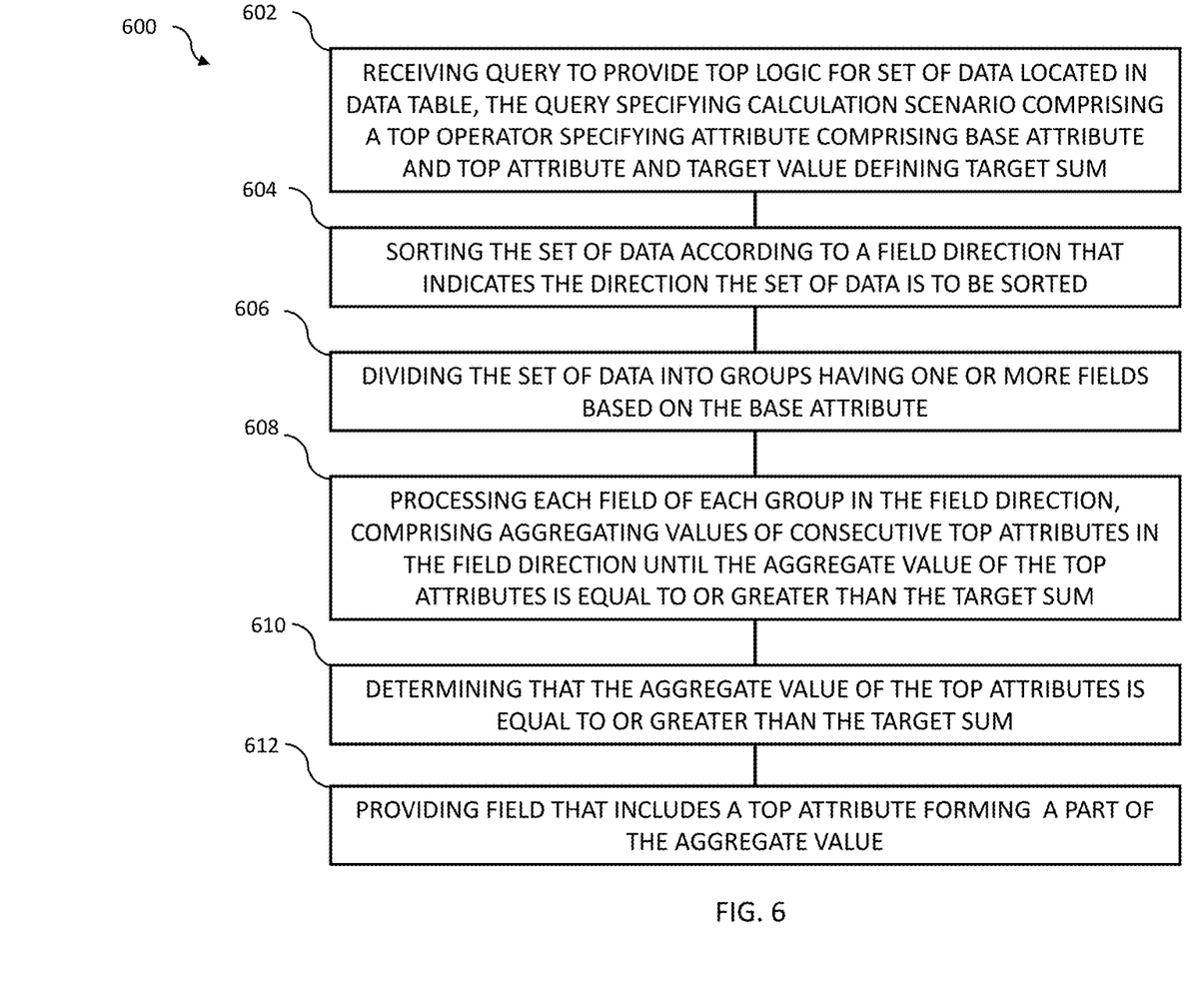
FIG. 6 shows a process flow diagram illustrating aspects of a method having one or more features consistent with implementations of the current subject matter.

FIG. 6 shows a process flow chart 600 illustrating features of a method consistent with one or more implementations of the current subject matter. It will be understood that other implementations may include or exclude certain features.

At 602, the calculation engine can receive a query to provide top logic for a set of data. The set of data can be filtered and/or be located in a data table. In some implementations, the query can be requested using one or more of the following (with the text in italics and underline as placeholders for the specified attributes and target value):

SELECT TOP "*ViewAttribute*" per "*BaseAttribute*" WITH "*TopAttribute*"=*TargetValue*

As shown above, the query can specify a calculation scenario. The calculations scenario can include a top operator of a calculation engine. The top operator may specify at least one attribute and/or a target value. The at least one attribute can include a base attribute and a top attribute. The at least one attribute can include a base attribute, a view attribute, and/or a top attribute. As mentioned above, the base attribute and/or the view attribute can include a plurality of base attributes (e.g., a product) and/or view attributes (e.g., a customer). In some implementations, the at least one attribute may include only one top attribute (e.g., sales) for each field. In some implementations, to define the top operator, at least one base attribute and one numerical top attribute must be defined. The top attribute may be represented as a numerical value. In some implementations, an integer and/or floating point numeric type can represent the top attribute.

In some implementations, the query can specify a selected target value. The target value can define a target sum. The target value can be selected and/or specified for each group of base attributes. The target value can be defined in a cumulatedTargetValue field. As discussed in more detail below, the target value for cumulative sum operations (such as using the TOP_CUM_SUM top operator) defines the maximum desired cumulated sum value of the top attribute for each group. The target value for cumulative percent operations (such as using the TOP_CUM_PRC top operator) defines the maximum cumulated percent value (such as between 0 and 1) of the top attribute for each group that describes the relative cumulated sum according to the aggregated sum of each group.

At 604, the set of data can be sorted according to a specified field direction. The field direction can indicate the direction that the set of data is to be sorted, such as within the table. The set of data within the table can be sorted according to the top attribute and/or the base attribute. For example, the set of data can be sorted based on the value of the top attribute in ascending and/or descending order. In some implementations in which the table includes more than one group, the set of data for each group can be sorted based on the value of the top attribute in ascending and/or descending order. The direction that the set of data is to be sorted can be defined at the top operator in a direction field (e.g., "direction") that includes values "first" (to indicate top to bottom) or "last" (to indicate bottom to top) to indicate the direction.

At 606, before, at the same time, and/or after the set of data is sorted at 604, the set of data can be divided into one or more groups based on the base attribute. The one or more groups can include one or more fields of the table. Each group may be processed independently by the calculation engine. For example, the set of data can be sorted for a first group (e.g., as shown in FIG. 5) in descending and/or ascending order and the set of data can be sorted for a second group following the first group, in descending and/or ascending order. As mentioned above, the fields in each group include the same base attribute or base attributes.

At 608, each field of each group of the one or more groups can be processed in the specified direction. To process each field, the value of each of the top attributes for each field in each group can be aggregated. In some implementations, the top operator can use the target sum defined by the target value to process each field of each group. In queries in which the cumulative sum is requested, the target sum may be defined directly by the target value specified in the query. In queries in which the cumulative percent is requested, the target value may be further processed to define the target sum. For example, to define the target sum in cumulative percent operations, each of the values associated with the top attribute for each group can be aggregated. The specified target value (e.g., a percent) can be applied to (e.g., multiplied by) the aggregated value for each group to determine the target sum.

In some implementations, each field of each group can be processed until the aggregate value of the top attributes in each group is equal to or greater than the target sum. For example, at 610, the top operator of the calculation engine can determine that the aggregate value of the top attributes is equal to or greater than the target sum. In some implementations, each field of each group can be processed until the target condition is met (e.g., "cumulated_sum=target value" or "cumulated target value=actual target sum= targetvalue"). In some implementations, the target condition is met if the cumulated sum with N rows is smaller than the target value, but the cumulated sum with N+1 rows is larger. In such circumstances, the N-th row can be added to the result as the last row. In some implementations, the top operator allows the target value to be exceeded. In some implementations, the top operator allows the target value to be exceeded only with the last field.

In some implementations, when the target sum is reached for each group, no further rows may be processed such that no further rows may be added to the result for each group. In some implementations, when the target sum is reached for each group, further rows may be processed if an olympic ranking flag is active, as explained in more detail below.

At 612, the top operator can provide the result. The result can include the field (or fields) for each group that includes the top attribute forming a part of the aggregate value (e.g., the top number of rows N). For example, the fields that are processed can be provided in the result.

In some implementations, the calculation engine can receive a query to generate a top cumulative sum. For example, the calculation engine can receive the following inputs:

Example 1: TOP_CUM_SUM

SELECT TOP "customers" per "product" WITH "sales"=14000
cumulated target value=actual target sum=14000 for both apples and bananas
direction=first In Example 1 above, the base attribute is labeled as the "product", the view attribute is labeled as the "customers", and the top attribute is labeled as "sales". The target value defining the target sum is 14000. The table can be sorted and divided as shown as the example table 500 shown in FIG. 5. As shown, the table 500 includes two groups, a first group 514 and a second group 516. The first group 514 includes the fields having the base attribute defined as an apple and the second group 516 includes the fields having the base attribute defined as a banana. Each field of each group can then be processed by the top operator in the first direction (e.g., top to bottom direction).

During processing of each group, the value of the top attribute of each group is aggregated until the aggregate value of the top attributes is equal to or greater than the target sum. For example, the first field of the first group (indicated by ID number 2) includes a top attribute value of 10000 and the second field (indicated by ID number 1) includes a top attribute value of 4000. Since the aggregate value of the first and second fields of the first group is 14000 (10000+4000), no further fields in the first group are processed, and the first two fields are added to the result. The first field of the second group (indicated by ID number 4) includes a top attribute value of 14000. Since the value of the first field of the second group is 14000, no further fields in the second group are processed, and the first field of the second group is added to the result. The result can then be provided including the fields having ID numbers 1, 2, and 4.

In some implementations, the calculation engine can receive a query to generate a top cumulative percent. For example, the calculation engine can receive the following inputs:

Example 2: TOP_CUM_PRC

SELECT TOP "customers" per "product" WITH "sales"=75% of all "sales"
cumulated target value=0.75
direction=first In Example 2 above, the base attribute is labeled as the "product", the view attribute is labeled as the "customers", and the top attribute is labeled as "sales". The target value is 75% of all sales. The table can be sorted and divided as shown as the example table 500 shown in FIG. 5. As shown, the table 500 includes two groups, a first group 514 and a second group 516. The first group 514 includes the fields having the base attribute defined as an apple and the second group 516 includes the fields having the base attribute defined as a banana. Each field of each group can then be processed by the top operator in the first direction (e.g., top to bottom direction).

To define the target sum, the value of all of the attribute values of each group can be aggregated by the top operator and the aggregate value can be multiplied by the target value (0.75). Using the example table 500 as shown in FIG. 5, the aggregate sum of the first group 514 is 18000 (10000+4000+4000) and the aggregate sum of the second group 516 is 20000 (14000+2000+2000+2000). The target value can be multiplied by the aggregate sum to define the target sum for each group. For example, the target sum of the first group 514 is 13500 (0.75*18000) and the target sum of the second group 516 is 15000 (0.75*20000).

During processing of each group, the value of the top attribute of each group is aggregated until the aggregate value of the top attributes is equal to or greater than the target sum. For example, the first field of the first group (indicated by ID number 2) includes a top attribute value of 10000 and the second field (indicated by ID number 1) includes a top attribute value of 4000. In the first group, the value of the top attribute of the first field is less than the target sum of 13500. The aggregate value of the values of the top attributes of the first and second fields in the first group is 14000 (10000+4000), which is greater than the target sum. Thus, no further fields in the first group are processed, and the first two fields are added to the result. The first field of the second group (indicated by ID number 4) includes a top attribute value of 14000 (less than the target sum of 15000). The second field of the second group (indicated by ID number 5) includes a top attribute value of 2000. Since the aggregate value of the top attributes of the first field and the second field of the second group is 16000, no further fields in the second group are processed, and the first and second fields of the second group are added to the result. The result can then be provided including the fields having ID numbers 1, 2, 4, and 5.

As mentioned above, in some implementations, the top operator can include an olympic ranking flag. Generally when implementing olympic ranking, if the field next to the last field included into the result for each group has the same top attribute value as the last field in the result, the next to the last field is included in the result. Olympic ranking can be applied to typical top operations selecting N first and/or last rows, and/or the cumulative top operations criterion described herein.

The olympic ranking flag operation can be set to active (e.g., set to true) or inactive (e.g., set to false). The top operator can implement olympic ranking when the olympic ranking flag is active. In olympic ranking, as mentioned above, the top operator can determine that a value of the top attribute of a last field included in the result for each group is identical to one or more next values of the top attribute of one or more next fields that appear after the last field. For example, the values of consecutive top attributes can include a first value and a last value. In this case, the next value can also be added to the result for each group.

In some implementations, the calculation engine can receive a query to generate the top and/or last N rows, with the olympic ranking flag set to active.

For example, the calculation engine can receive the following inputs:

Example 3: TOP_FIRST_AGGR (first TOP N)

SELECT TOP 2 "customers" per "product" on "sales"

In Example 3 above, the base attribute is labeled as the "product", the view attribute is labeled as the "customers", and the top attribute is labeled as "sales". The table can be sorted and divided as shown as the example table 500 shown in FIG. 5. As shown, the table 500 includes two groups, a first group 514 and a second group 516. The first group 514 includes the fields having the base attribute defined as an apple and the second group 516 includes the fields having the base attribute defined as a banana. Each field of each group can be sorted in descending order based on the value of the top attribute corresponding to each field.

In this example, the top two (N) fields are requested for each group. In situations in which the olympic ranking flag is inactive, the top operator can simply provide the top two fields in each group. For example, the top operator would provide fields 1 and 2 of group 1 (indicated by ID numbers 1 and 2, respectively) and fields 1 and 2 of group 2 (indicated by ID numbers 4 and 5, respectively).

In some implementations in which the olympic ranking flag is active, the N+1 to N+k fields may be added to the result, in addition to the top N fields, if the attribute values of the fields N+1 to N+k are identical to the attribute value of the Nth field in each group. For example, with the olympic ranking flag active in Example 3, the top operator would provide fields 1, 2, and 3 for the first group, where N=2. As shown in table 500, field 2 (indicated by ID number 2) has a top attribute value of 4000. Since field 3 (indicated by ID number 2) also has a top attribute value of 4000, field 3 is added to the result. In this example, for the first group, k=1. For the second group, the top operator would provide fields 1, 2, 3, and 4 of the second group (indicated by ID numbers 4, 5, 6, and 7, respectively), since field 2 has a top attribute value of 2000 and fields 3 and 4 of group 2 also have top attribute values of 2000. In this example, for the second group, k=2. Such configurations can help to provide more complete results. This can help in making better and/or more informed decisions.

In some implementations, the calculation engine can receive a query to generate the top N rows according to certain logical criterion described herein, including cumulative sum and/or percent, with the olympic ranking flag set to active. In such configurations, if the target sum has been reached and/or exceeded with N fields, the next [N+1, N+k] fields can be added to the result if the top attribute values of the next [N+1, N+k] fields are identical to the top attribute value of the Nth field.

For example, the calculation engine can receive the following inputs:

Example 4: TOP_CUM_PRC with OlympicRankingFlag

SELECT TOP "customers" per "product" WITH "sales"=75% of all "sales"

Example 4 above is the same as Example 2 described above, with the olympic ranking flag set to active, rather than inactive. As mentioned above, without the olympic ranking flag set to active, the top operator would provide in the result, fields 1 and 2 (indicated by ID numbers 1 and 2) of the first group and fields 1 and 2 (indicated by ID numbers 4 and 5) of the second group.

With the olympic ranking flag set to active, the top operator would also include in the result, field 3 (indicated by ID number 3) of the first group and fields 3 and 4 (indicated by ID numbers 6 and 7, respectively), of the second group. As shown in table 500, the Nth field of the first group has a top attribute value of 4000 and the field N+1 (e.g., field 3 of the first group) has a top attribute value of 4000, which is identical to the top attribute value of the Nth field. Thus, the top operator includes fields 1, 2, and 3 of the first group in the result. As shown in table 500, the Nth field of the second group has a top attribute value of 2000, the field N+1 (e.g., field 3 of the second group) has a top attribute value of 2000, and the field N+2 (e.g., field 4 of the second group) has a top attribute value of 2000, which are identical to the top attribute value of the Nth field. Thus, the top operator includes fields 1, 2, 3, and 4 of the second group in the result. In this example, k=1 for the first group and k=2 for the second group. Such configurations can help to provide more complete results. This can help in making better and/or more informed decisions.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;"

"one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A system comprising:
   at least one processor; and
   machine-readable memory storing instructions, which when executed by the at least one processor, cause the at least one programmable processor to perform operations comprising:
   receiving a query to provide top logic for a set of data located in a data table, the query specifying a calculation scenario comprising a top operator of a calculation engine, the top operator specifying an attribute and a target value, the attribute comprising a base attribute and a top attribute, and the target value defining a target sum;
   sorting, by the top operator, the set of data within the data table according to a field direction that indicates a direction the set of data is to be sorted, the sorting including dividing the set of data within the data table into one or more groups based on the base attribute, the one or more groups comprising one or more fields of the data table;
   processing, by the top operator, each field of each group of the one or more groups in the field direction, the processing comprising aggregating values of consecutive top attributes in the field direction until the aggregate value of the top attributes is equal to or greater than the target sum; and
   providing, by the top operator, in response to the query, each field in each group that includes a top attribute that forms a part of the aggregate value.

2. The system of claim 1, wherein the processing further comprises determining that the aggregate value of the top attributes is equal to or greater than the target sum.

3. The system of claim 1, wherein the target sum is determined by aggregating all of the values of the top attributes in each group of the one or more groups and applying the target value to the aggregated values of the top attributes in each group, the target value representing a percentage.

4. The system of claim 1, wherein the attribute includes a plurality of view attributes.

5. The system of claim 1, wherein the operations further comprises determining that an olympic ranking flag operator is active and applying the olympic ranking operations, wherein the values of consecutive top attributes includes a first value or a last value.

6. The system of claim 5, wherein the applying the olympic ranking operations comprises determining that a next value of the top attribute is identical to the last value, the next value comprising a value of the top attribute of the data entry that follows the last entry in the sorting direction.

7. The system of claim 6, wherein the applying the olympic ranking operations further comprises providing the field corresponding to the next value.

8. A computer-implemented method, comprising:
   receiving a query to provide top logic for a set of data located in a data table, the query specifying a calculation scenario comprising a query top operator of a calculation engine, the top operator specifying an attribute and a target value, the attribute comprising a base attribute and a top attribute, and the target value defining a target sum;
   sorting, by the top operator, the set of data within the data table according to a field direction that indicates a direction the set of data is to be sorted, the sorting including dividing the set of data within the data table into one or more groups based on the base attribute, the one or more groups comprising one or more fields of the data table;
   processing, by the top operator, each field of each group of the one or more groups in the field direction, the processing comprising aggregating values of consecutive top attributes in the field direction until the aggregate value of the top attributes is equal to or greater than the target sum; and
   providing, by the top operator, in response to the query, each field in each group that includes a top attribute that forms a part of the aggregate value.

9. The method of claim 8, further comprising determining that the aggregate value of the top attributes is equal to or greater than the target sum.

10. The method of claim 8, wherein the target sum is determined by aggregating all of the values of the top attributes in each group of the one or more groups and applying the target value to the aggregated values of the top attributes in each group, the target value representing a percentage.

11. The method of claim 8, wherein the attribute includes a plurality of view attributes.

12. The method of claim 8, further comprising determining that an olympic ranking flag operator is active and applying the olympic ranking operations, wherein the values of consecutive top attributes includes a first value or a last value.

13. The method of claim 12, wherein the applying the olympic ranking operations comprises determining that a next value of the top attribute is identical to the last value, the next value comprising a value of the top attribute of the data entry that follows the last entry in the sorting direction.

14. The method of claim 13, wherein the applying the olympic ranking operations further comprises providing the field corresponding to the next value.

15. A non-transitory computer-readable medium storing instructions, which when executed by at least one data processor, result in operations comprising:
  receiving a query to provide top logic for a set of data located in a data table, the query specifying a calculation scenario comprising a query top operator of a calculation engine, the top operator specifying an attribute and a target value, the attribute comprising a base attribute and a top attribute, and the target value defining a target sum;
  sorting, by the top operator, the set of data within the data table according to a field direction that indicates a direction the set of data is to be sorted, the sorting including dividing the set of data within the data table into one or more groups based on the base attribute, the one or more groups comprising one or more fields of the data table;
  processing, by the top operator, each field of each group of the one or more groups in the field direction, the processing comprising aggregating values of consecutive top attributes in the field direction until the aggregate value of the top attributes is equal to or greater than the target sum; and
  providing, by the top operator, in response to the query, each field in each group that includes a top attribute that forms a part of the aggregate value.

16. The non-transitory computer-readable medium of claim 15, wherein the operations further comprises determining that the aggregate value of the top attributes is equal to or greater than the target sum.

17. The non-transitory computer-readable medium of claim 15, wherein the target sum is determined by aggregating all of the values of the top attributes in each group of the one or more groups and applying the target value to the aggregated values of the top attributes in each group, the target value representing a percentage.

18. The non-transitory computer-readable medium of claim 15, wherein the attribute includes a plurality of view attributes.

19. The non-transitory computer-readable medium of claim 15, wherein the operations further comprises determining that an olympic ranking flag operator is active and applying the olympic ranking operations, wherein the values of consecutive top attributes includes a first value or a last value.

20. The non-transitory computer-readable medium of claim 19, wherein the applying the olympic ranking operations comprises determining that a next value of the top attribute is identical to the last value, the next value comprising a value of the top attribute of the data entry that follows the last entry in the sorting direction.

* * * * *